J. C. SWANSON.
ENDLESS CUTTING APPARATUS FOR MOWING MACHINES AND HARVESTERS.
APPLICATION FILED AUG. 6, 1913.
1,136,628.
Patented Apr. 20, 1915.
2 SHEETS—SHEET 1.
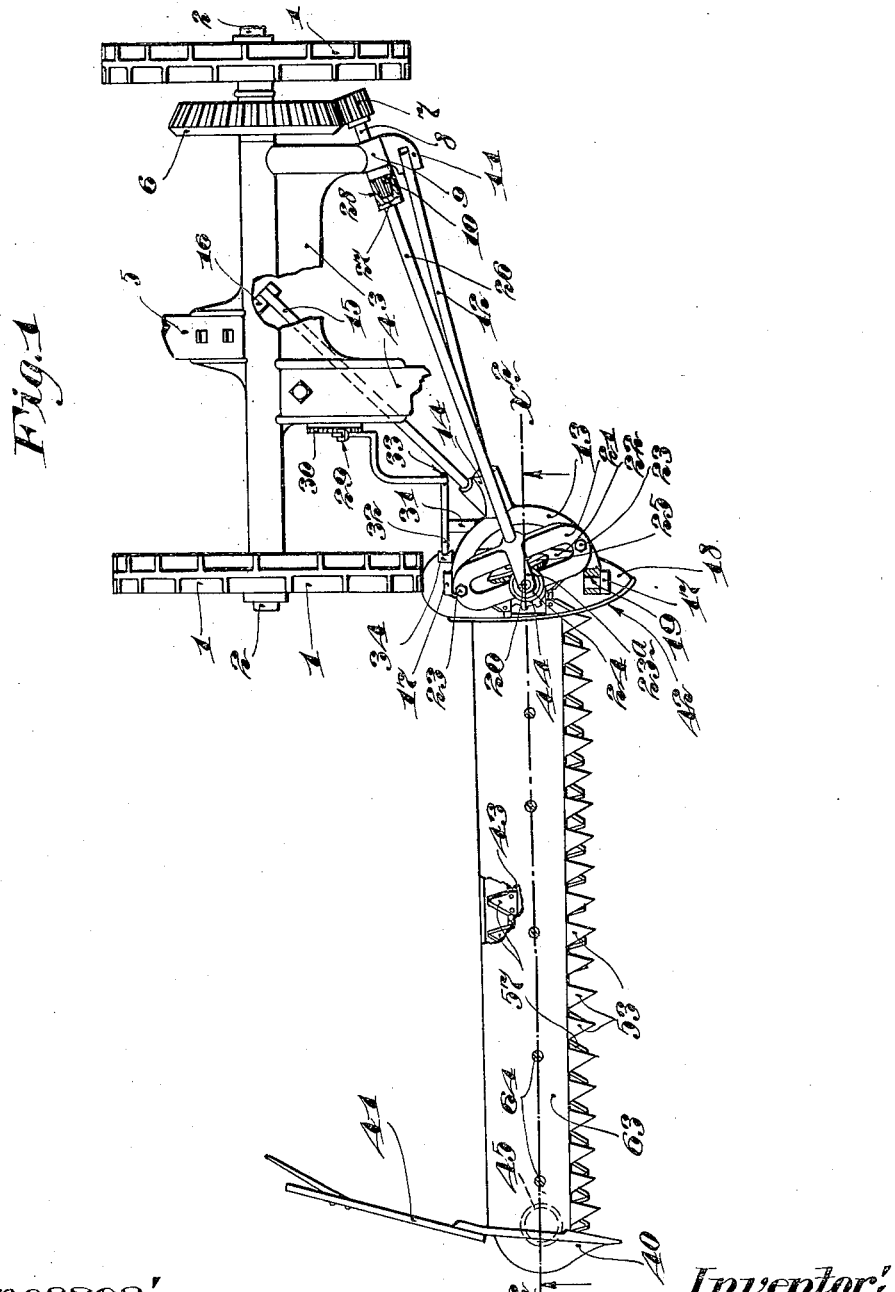

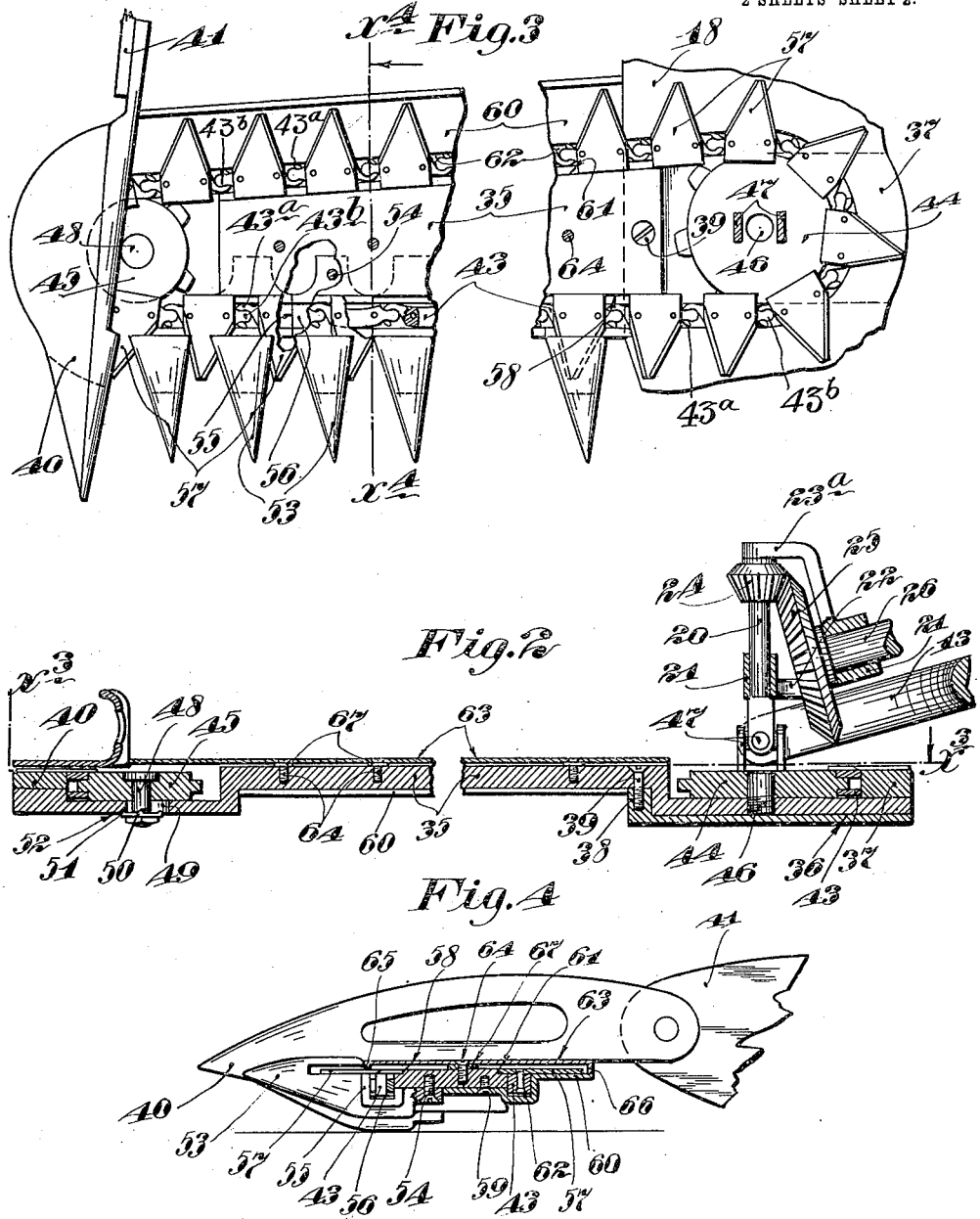

UNITED STATES PATENT OFFICE.

JOHN C. SWANSON, OF BUFFALO, MINNESOTA.

ENDLESS CUTTING APPARATUS FOR MOWING-MACHINES AND HARVESTERS.

1,136,628.  Specification of Letters Patent.  Patented Apr. 20, 1915.

Application filed August 6, 1913. Serial No. 783,316.

*To all whom it may concern:*

Be it known that I, JOHN C. SWANSON, a citizen of the United States, residing at Buffalo, in the county of Wright and State of Minnesota, have invented certain new and useful Improvements in Endless Cutting Apparatus for Mowing-Machines and Harvesters; and I do hereby declare the following to be a full, clear, and exact description of the invention, such as will enable others skilled in the art to which it appertains to make and use the same.

My invention relates to improvements in endless cutting apparatus for mowing machines and harvesters.

To the above ends, the invention consists of the novel devices and combinations of devices hereinafter described and defined in the claims.

In the accompanying drawings, which illustrate the invention, like characters indicate like parts throughout the several views.

Referring to the drawings: Figure 1 is a plan view of a mowing machine having my invention embodied therein, some parts being broken away; Fig. 2 is a vertical section taken on the line $x^2$ $x^2$ of Fig. 1, on an enlarged scale; Fig. 3 is a horizontal section taken on the line $x^3$ $x^3$ of Fig. 2, some parts being broken away; and Fig. 4 is a transverse vertical section, taken on the line $x^4$ $x^4$ of Fig. 3.

For the purpose of showing my invention applied in working position, a portion of a mowing machine has been illustrated in the drawings. Of the parts of the mowing machine, which may be of the standard or any desired construction, the numeral 1 indicates the wheels journaled on an axle 2, and the numeral 3 indicates the frame mounted on the axle 2 and having secured thereto the customary tongue 4 and seat support 5.

Keyed or otherwise secured to the axle 2 is a large bevel gear 6 that meshes with a pinion 7, rigidly secured, at one end, to a short shaft 8. This shaft 8 is journaled, at its intermediate portion, in a comparatively long bearing 9, integrally formed with the frame 3, and has rigidly secured thereto a bevel pinion 10. On the forward portion of the bearing 9 is integrally formed a bifurcated lug 11, to the prongs of which is pivotally connected, at its rear end, a long bar 12, for connecting the cutting mechanism to the frame 3. This bar 12 extends forwardly and laterally toward the grain side of the swath and terminates, at its forward end, in a bifurcated head 13. On the forward end of the bar 12, adjacent to the bifurcated head 13, is loosely journaled a sleeve 14, to which is rigidly secured the forward end of a rearwardly diverging brace rod 15. The rear end of this brace rod 15 is pivotally attached to a bearing 16, rigidly secured to the under side of the frame 3, adjacent to the seat support 5. By reference to Fig. 1, it will be noted that the pinion 10 is vertically and horizontally alined with the rear pivotal connections of the bar 12 and rod 15, the purpose of which will presently appear.

The cutting mechanism is secured to the bifurcated head 13, for swinging movement transversely of the direction of travel of the machine, by a pair of horizontally alined trunnions 17, rigidly secured to the upper face of the inner drag shoe 18, and journaled in eyes 19 formed in the ends of the prongs of the bifurcated head 13. A short, vertically extended shaft 20 is journaled, at its lower end, in the front section of a yoke-like bridge bar 21 provided, at its intermediate portion, with a longitudinally extended slot 22. Machine screws 23 detachably secure the ends of the bridge bar 21 to the prongs of the bifurcated head 13. Integrally formed with the rear section of the bridge bar 21 is an upwardly and forwardly extended bearing arm 23ª, in which the upper end of the shaft 20 is journaled. Keyed or otherwise secured to the shaft 20, just below the bearing arm 23ª, is a bevel pinion 24 that meshes with a large bevel gear 25, working within the slot 22 of the bridge bar 21. This bevel gear 25 is rigidly secured to the forward end of a comparatively long driving shaft 26 journaled, at its forward end, in the rear section of the bridge bar 21, at the junction of the bearing arm 23ª therewith. At its rear end, the shaft 26 terminates in a recessed coupling head 27, adapted to telescopically receive the pinion 10. This coupling head 27 is provided with internal teeth 28 that loosely mesh with the teeth of the bevel pinion 10. As is evident, the bevel pinion 10 and coupling head 27 form a flexible connection between the shafts 8 and 26.

Owing to the novel arrangement of the connections between the cutting mechanism and the frame 3, the drag shoe 18 is free to rise and fall as the same travels over irregularities in the field. It is also evident that the flexible connections between the shafts 8 and 26 will prevent the driving connections from binding during such movements of the drag shoe 18 and also during undue strains on the machine. The loosely journaled sleeve 14 on the rod 12 will also permit the drag shoe 18 and connected parts to oscillate on an axis extending transversely of the direction of travel of the machine.

For raising the cutting mechanism, I secure to one side of the support for the tongue 4 a hand lever 29 and coöperating lock segment 30, and to the rearwardly projecting bearing 31, integrally formed on the bifurcated head 13, is intermediately pivoted a horizontally extended lever 32. The long end of this lever 32 is connected to the hand lever 29 by means of a link 33 and the short or free end thereof overlies and rests upon a lug 34, integrally formed on the opposite side of the drag shoe 18 from the cutting mechanism. By moving the hand lever 29 in the proper direction, the short end of the lever 32 will force the lug 34 downward, thereby lifting the outer or free end of the cutting mechanism. The parts numbered from 6 to 34 inclusive, just described, are identical with and made the subject of my co-pending application herein identified.

Referring now to the cutting mechanism, which is the subject matter of my present application, the numeral 35 indicates the cutter or sickle bar which is in the form of a flat horizontally extended bar having end portions that are downwardly offset from the main body thereof. As shown, the longitudinal rear edge of this bar is preferably tapered from its fixed toward its free end. The inner offset end of the sickle bar 35 is detachably mounted in a seat 36 formed transversely through the shoe 18. Integrally formed with the shoe 18 are a bridge bar 37 and a stop flange 38. The bridge bar 37 extends across the inner end portions of the seat 36 and overlies a portion of the sickle bar 35, and the stop flange 38 completely closes the outer end portion of the seat 36. At its inner offset portion, the shoulder of the sickle bar 35 abuts against the flange 38. The sickle bar 35 is secured to the stop flange 38 by means of a machine screw 39. An outer drag shoe 40 is secured to and rests upon the outer offset end of the sickle bar 35. The outer drag shoe 40 is provided with the customary grass or grain dividing board 41, and the inner drag shoe 18 is provided with the customary guard flange 42.

A sprocket chain 43 runs over relatively large and small sprocket wheels 44 and 45, respectively, which are horizontally alined and mounted, respectively, upon the upper faces of the inner and outer offset end portions of the sickle bar 35. The sprocket wheel 44 is loosely journaled on a short vertically extended stud 46, anchored to the inner offset end of the sickle bar 35, in axial alinement with the shaft 20. The sprocket wheel 44 is positively driven from and connected to the shaft 20 by a universal joint 47. It is important to note that this universal joint 47 is alined with the connections between the bifurcated head 13 and the sickle bar 35, in order to permit the swinging movement of the cutting mechanism with respect to the machine proper.

The sprocket wheel 45 is loosely journaled on a vertically extended bolt 48, having its head countersunk in said sprocket wheel and having its lower end portion working in a slot 49 formed in the outer offset end portion of the sickle bar 35. This slot 49 permits the sprocket wheel 45 to be moved toward and from the sprocket wheel 44 for the purpose of adjusting the sprocket chain. Mounted on the lower end of the bolt 48 is a washer 50 having, on its upper face, projections 51 adapted to enter coöperating depressions 52 formed in the under face of the outer laterally offset end of the sickle bar 35. These coöperating projections 51 and depressions 52 permit the sprocket wheel 45 to be positively secured in different adjustments with respect to the sprocket wheel 44.

Guard fingers 53 are independently and detachably secured to the under face of the sickle bar 35 by machine screws 54. The sides of each guard finger 53, adjacent to the front edge of the sickle bar 35, are expanded to form a pair of oppositely projecting shoulders 55 which closely engage the shoulders of adjacent guard fingers, as best shown in Fig. 3. Cut transversely through the guard fingers 53, at their shoulders 55, is a continuous channel 56 extending parallel with the front edge of the sickle bar 35 and having its bottom portion located in the same plane with the upper faces of the offset end portions of the sickle bar 35. By reference to Fig. 4, it will be noted that the upper portion of the rear wall of the channel 56 is formed by the front vertical face of the sickle bar 35.

The sprocket chain 43 is mounted to run through the channel 56 and is held for straight line movement thereby. As best shown in Fig. 2, it will be noted that each link of the chain 43 is in the form of a segment, with its outwardly curved intermediate portion engaging the front wall of the channel 56 and with its inwardly curved ends engaging the rear wall of said channel. By this construction of the links of the chain 43, the friction between the chain and the channel is greatly reduced. One end of each link of the chain 43 terminates in a hook 43ª that has detachable interlocking engagement with a coupling pin 43ᵇ of the adjacent link.

Sickle knives 57 are rigidly secured, one to the upper face of each of the links of the chain 43, by rivets or other suitable means. The front portions of the sickle knives 57 rest upon and slide over the upper faces of the guard fingers 53, in the customary manner. At their rear ends, these knives extend slightly beyond the sprocket chain 43 and slide laterally over a stop shoulder 58 formed in the front, upper edge of the sickle bar 35. As best shown in Fig. 4, the sickle knives 57 support the chain 43 slightly above the bottom of the channel 56, so that the said knives always rest flat on the guard fingers 53.

Secured to the under face of the sickle bar 35, by means of machine screws 59, is a rearwardly and horizontally extended guide plate 60, over which and a stop shoulder 61, formed in the rear upper edge of the sickle bar 35, the sickle knives 57 slide during their return movement. In the guide plate 60 is pressed a channel 62 which, in connection with the rear vertical face of the sickle bar 35, guides the chain 43 in its return movement. A flat cover 63 is detachably secured to the sickle bar 35 by machine screws 64 and completely covers the sickle knives 57, except during their operative travel over the guard fingers 53. At its longitudinal edges, the cover 63 is provided with front and rear downwardly extended flanges 65 and 66, respectively. The flange 65 lightly engages the sickle knives 57 and the flange 66 rests upon the upper outer longitudinal edge of the guide plate 60. Spacing washers 67 on the machine screws 64 hold the cover 63 slightly above the sickle bar 35. As best shown in Fig. 1, the cutting edges of the sickle knives 57 are inclined to secure the proper shearing action with respect to the guard fingers 53, and the opposite edges of said knives are formed comparatively straight, to add strength thereto.

By reference to Fig. 4, it will be noted that the cover 63 abuts against the inner ends of the upper sections of the guard fingers 53 and is located slightly below the upper surfaces thereof, thereby forming a smooth unobstructed surface over which the cut grass falls. It will also be noted that the last guard finger 53 on the outer or free end of the sickle bar 35 is considerably thicker than the other guard finger, thereby taking a great deal of the wear therefrom.

What I claim is:

1. In a machine of the kind described, the combination with an inner drag shoe, having a depression, of a sickle bar, having its inner end portion offset in a plane below the body thereof and detachably and removably seated in the depression of said shoe.

2. In a machine of the kind described, the combination with an inner drag shoe, having a bridge bar and a stop flange, of a sickle bar, having its inner end portion offset in a plane below the body thereof, said offset portion having detachable interlocking engagement with the bridge bar and stop flange of said shoe.

3. In a machine of the kind described, the combination with a sickle bar, of independent guard fingers, removably secured to said sickle bar and having oppositely projecting shoulders, the shoulders of one of said guard fingers closely engaging the shoulders of adjacent guard fingers, a continuous unbroken channel cut transversely through said guard fingers and their shoulders, and having tight closed walls and bottom throughout its entire length a driven sprocket chain arranged to run in said channel, and sickle knives secured to said chain.

In testimony whereof I affix my signature in presence of two witnesses.

JOHN C. SWANSON.

Witnesses:
W. D. OAKLEY,
R. E. RORD.

Copies of this patent may be obtained for five cents each, by addressing the "Commissioner of Patents, Washington, D. C."